United States Patent
Kimball et al.

(10) Patent No.: US 6,301,398 B1
(45) Date of Patent: *Oct. 9, 2001

(54) APPARATUS AND METHOD OF PROCESSING MICROFICHE IMAGES

(75) Inventors: Glenn S. Kimball, Modesto; Marek A. Niczyporuk, Palo Alto, both of CA (US)

(73) Assignee: Cyberecord, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/504,254

(22) Filed: Feb. 15, 2000

(51) Int. Cl.[7] ............................................ G06K 9/00
(52) U.S. Cl. ........................ 382/319; 348/110; 348/96
(58) Field of Search ................................. 382/318, 319, 382/312, 317, 321; 283/76; 348/112, 110, 96; 358/448, 403, 404, 302, 296

(56) References Cited

U.S. PATENT DOCUMENTS

| | | | |
|---|---|---|---|
| 3,803,352 | * 4/1974 | Goldberger | 178/6.6 A |
| 3,942,885 | 3/1976 | Kool | 353/27 R |
| 4,067,648 | 1/1978 | Spreitzer | 353/27 R |
| 4,120,573 | 10/1978 | Johnston et al. | 353/27 A |
| 4,220,404 | 9/1980 | Hofmann et al. | 353/27 R |
| 4,245,898 | 1/1981 | Hall | 353/27 R |
| 4,334,743 | 6/1982 | Link | 353/97 |
| 4,339,181 | 7/1982 | Link et al. | 353/27 R |
| 4,424,535 | * 1/1984 | Rolhbort et al. | 358/294 |
| 4,529,281 | 7/1985 | DeRoche et al. | 353/27 A |
| 4,934,821 | * 6/1990 | Morton | 358/102 |
| 4,955,032 | * 9/1990 | Potzler et al. | 364/525 |
| 5,067,020 | * 11/1991 | Funton | 358/214 |
| 5,502,576 | * 3/1996 | Ramsay | 358/444 |
| 5,550,639 | * 8/1996 | Suzita | 358/302 |
| 5,574,577 | * 11/1996 | Wally, Jr. et al. | 358/487 |
| 5,647,654 | 7/1997 | Krzywdziak et al. | 352/27 R |
| 5,845,018 | * 12/1998 | Breish | 382/276 |
| 6,026,201 | * 2/2000 | Hattori | 382/312 |
| 6,057,941 | * 5/2000 | Furukawa et al. | 358/427 |

* cited by examiner

*Primary Examiner*—Joseph Mancuso
*Assistant Examiner*—Yosef Kassa
(74) *Attorney, Agent, or Firm*—William Patrick Waters

(57) ABSTRACT

Apparatus and method of processing microfiche images. The apparatus includes an unattended low-resolution wide area pre scanning station and an unattended high-resolution line scanning station. The low-resolution station automatically identifies active image areas and borders on a plurality of light passing documents transported in seriatim along a prescan path. The unattended low resolution scanning station generates a plurality of active image area signals indicative of the active image areas and borders in a plurality of light passing documents. The unattended high-resolution line scanning station includes a high-resolution line scanner that responds to the individual ones of said plurality of active image area signals. The high resolution scanning station automatically focuses the high resolution line scanner on only the active image areas of said light passing documents and then converts each scanned document image into a corresponding enhanced digital information signal that is indicative of the image information carried on the scanned document.

16 Claims, 4 Drawing Sheets

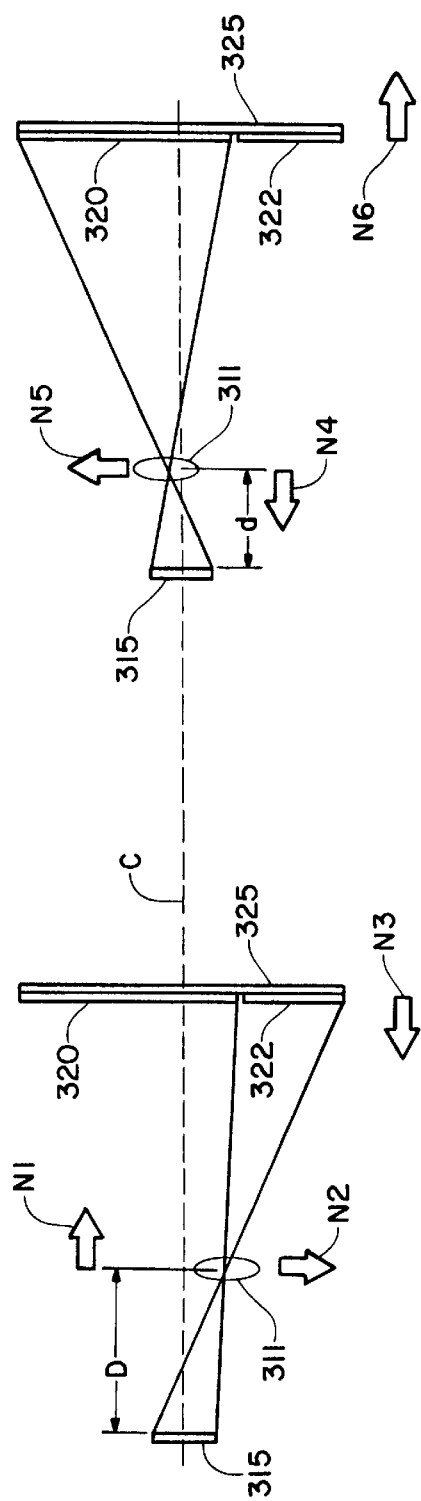
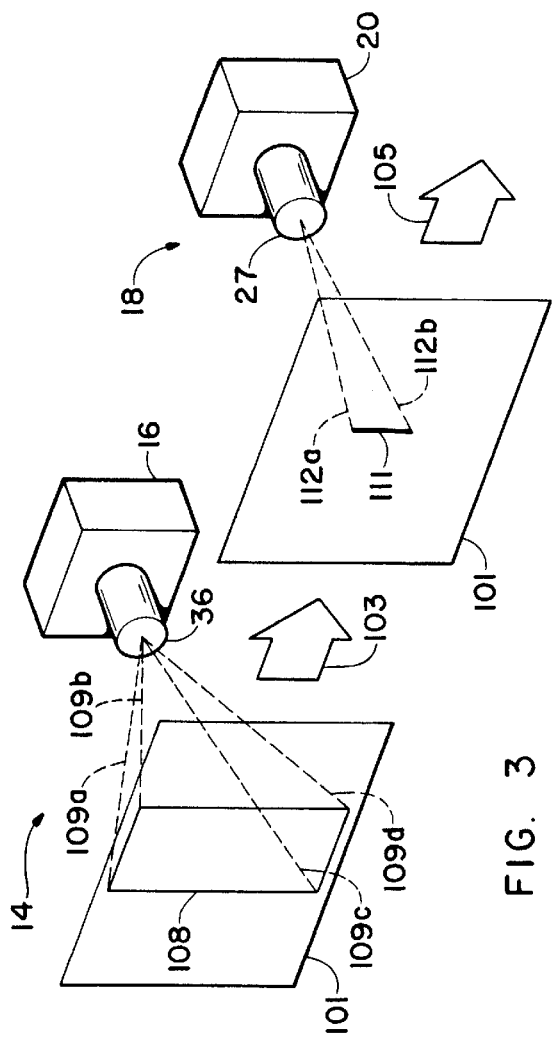
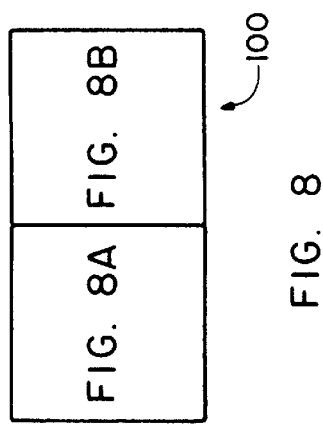

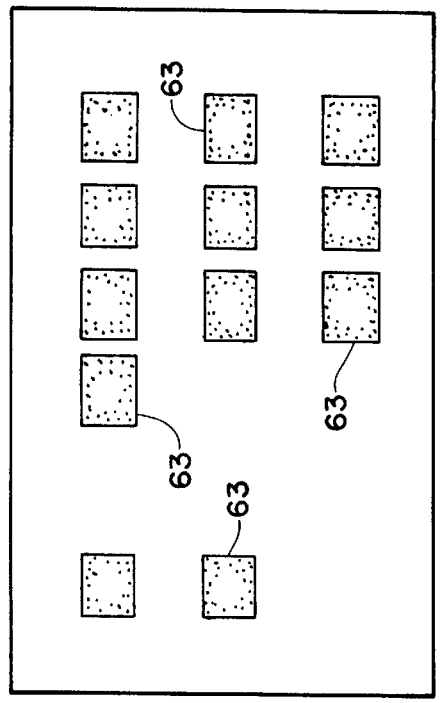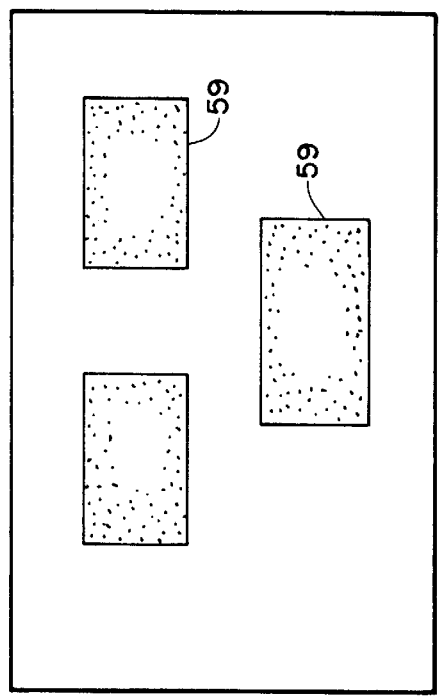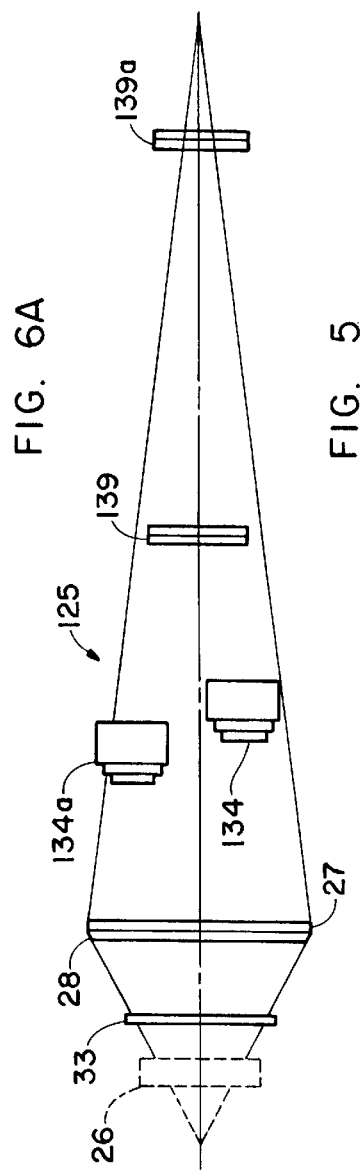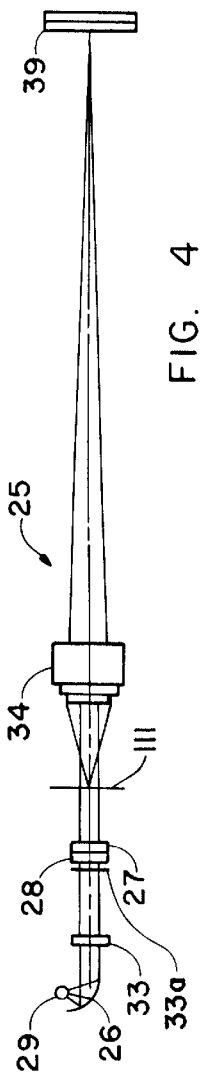
FIG. 6A
FIG. 6
FIG. 5
FIG. 4

APPARATUS AND METHOD OF PROCESSING MICROFICHE IMAGES

RELATED APPLICATIONS

This patent application is related to the following concurrent filed copending patent applications: Ser. No.: 09/504,255, by Marek A. Niczyporuk and Glenn S. Kimball, entitled "Information Processing System and Method of Using Same" and Ser. No.: 09/504,256, by Marek A. Niczyporuk and Glenn S. Kimball entitled "Apparatus and Method of Finding Active Microfiche Image Regions on a Canrier". Each of the aforementioned applications is assigned to the same assignee and each is incorporated by reference as though fully set forth herein.

TECHNICAL FIELD

The present invention relates to a method and apparatus for processing document information. More particularly, the invention relates to an image processing method and system for converting light passing media into enhanced digital documents.

BACKGROUND ART

For decades, in this and in foreign countries, virtually countless numbers of documents have been stored in media such as microfilm and microfiche. As an example, in the case of US census data, hundreds of millions of alphanumeric characters have been stored, in Hollerith code, in punch cards, or aperture cards. In general, these information storage techniques have represented cost-effective and convenient processes for archivng and distributing information.

As a result, storage of information on microfiche became widely popular and utilized by many organizations. Presently, one can find valuable and useful information stored on microfiche, for example, in commercial enterprises, law enforcement organizations and universities. It has been estimated that the number of documents stored on microfiche in the insurance industry alone is counted in the trillions. While the value of information stored on microfiche is recognized, recovering information from storage and rendering it usable by modern microfiche processing apparatus are frequently arduous, time consuming and labor intensive tasks.

Image scanners are often used for scanning and converting microfiche images into digital format However, conventional systems for accomplishing these task are complex and evasive. In this regard, reference may be made to U.S. pat. No. 5,845,018 titled "Method and Apparatus for Transferring Multiple Scanned Images from a First Medium to a Second Medium". While the invention therein disclosed has some utility and, indeed, attempts to simplify microfiche to digital document conversion, the apparatus itself is cumbersome and expensive. Further, operation of the apparatus is expensive since as many as one in every eight bits of high resolution data is supplied to a quality assurance station where a trained user determines if re-scanning is necessary. Clearly, it is desirable to have a relatively inexpensive microfiche processing apparatus that can be operated efficiently, without requiring skied employees to supervise system operations.

The situation is complicated further by the nature of typical microfiche media in which nonuniform images may be cropped, overlapped, skewed or distorted. They may have ragged or unclear borders. In such cases, conventional scanners have difficulty in locating the image to be scanned or determining the boundaries or edges of the image, especially in cases where the image is skewed For example, a conventional scanner may interpret a scratch on the microfiche as an image edge or boundary. Of course, such errors limit unattended operation of the scanner and when automatic scanner function fails, operator supervision and control become necessary, with concomitant increases in operating costs.

In view of the foregoing, it is clear that a need exists for a microfiche processing apparatus and method that produce superior digitized images from microfiche documents at high speeds and at substantially lower cost in comparison with conventional techniques. Desirably, such a system would itself be low in cost and capable of efficient, effective and unattended operation.

SUMMARY OF THE INVENTION

According to the present invention there is provided an unattended microfiche processing apparatus and method that includes an unattended low resolution wide area prescanning station and an unattended high resolution line scanning station. The low resolution station automatically locates and identifies the active image areas and borders on individual ones of a plurality of light passing documents, generating active image area signals indicative of the location of the identified active image areas. The unattended high resolution line scanning station includes a high resolution line scanner and scanner positioning system that responds to individual ones of the active image area signals by positioning and focusing the high resolution line scanner on only the active image areas of the light passing documents and then capturing and converting each scanned document image into a corresponding enhanced digital information signal that is indicative of the image information carried on the scanned document The techniques of processing microfiche images of the present invention are broadly versatile in their capability of scanning and converting a variety of media. Thus, by means of the present invention, it is possible efficiently to process microfiche and aperture cards, known generally as "cut-media". In addition, by incorporation of an interchangeable spooled-media transport module, discussed more fully below, the apparatus is capable of processing rollfilm.

The microfiche processing apparatus and methods of the present invention afford several advantages. For example, the apparatus provides, in an effective and efficient manner, techniques for digitization of all popular microfilm formats on 16/35 mm rollfilm, microfiche and aperture cards. Further, because it is comprised of readily available components, the apparatus is inexpensive to construct and to operate.

BRIEF DESCRIPTION OF DRAWINGS

The above mentioned features of the invention and the manner of attaining them will become apparent, and the invention itself will be best understood by reference to the following description of the embodiments of the invention in conjunction with the accompanying drawings wherein:

FIG. 3 is a schematic depiction of prescan and document conversion functions as a light passing medium moves through the apparatus of FIG. 1;

FIG. 4 is a schematic top plan view of the illumination subsystem of the present invention;

FIG. 5 is a schematic representation of the illumination subsystem of the present invention showing lens and camera positions for two extremes of film image magnification;

FIG. 6 is a schematic representation of a microfiche format showing one page to film reduction ratio;

FIG. 6A is a schematic representation of a microfiche format showing another page to film reduction ratio;

FIG. 8 is a schematic representation showing image, lens and CCD camera relationships for low-resolution high-speed functions and high resolution-low speed functions.

DESCRIPTION OF THE PREFERRED EMBODIMENT

Figure 1:
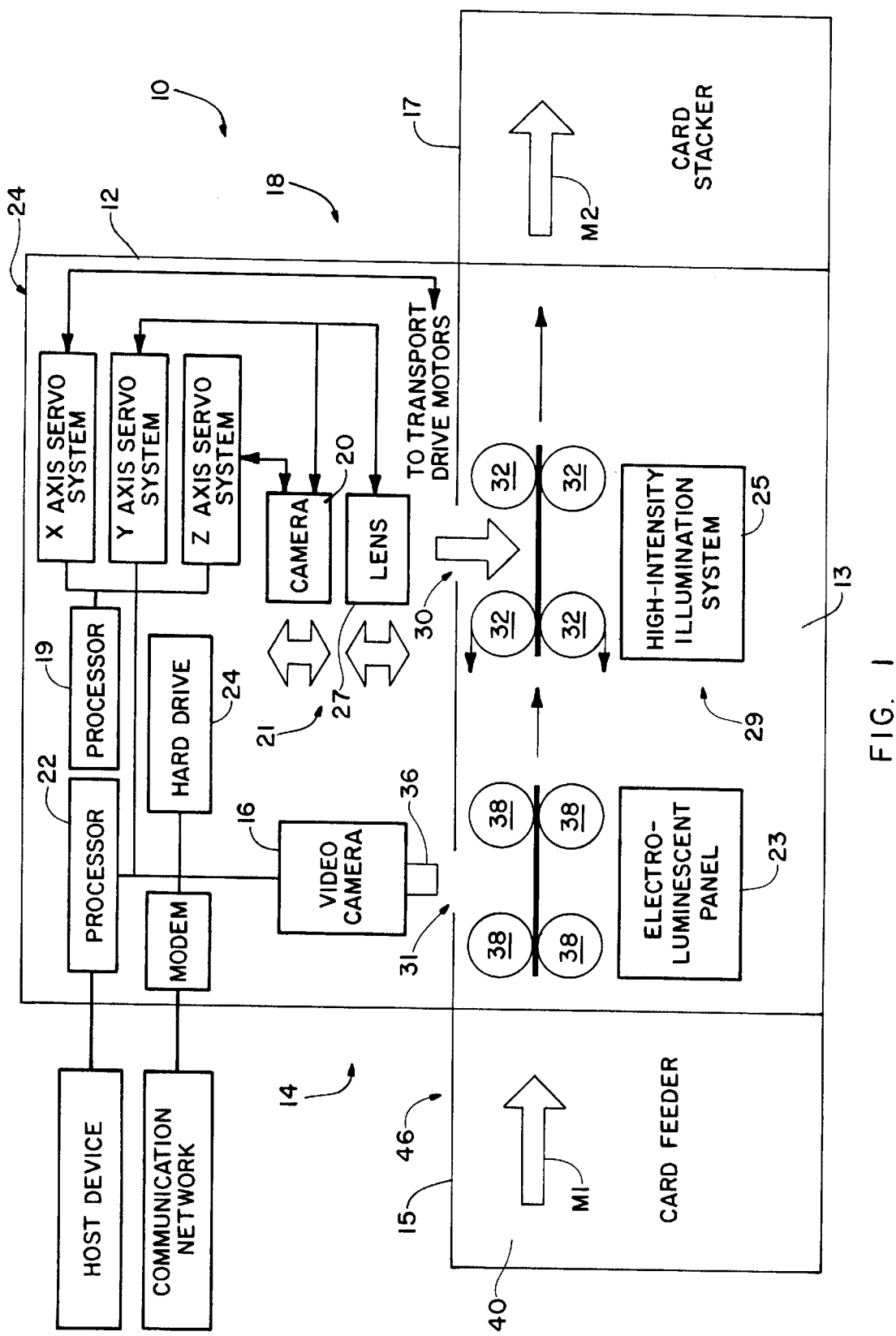
FIG. 1 is a block diagram of a microfiche processing System that is constructed in accordance with the present invention.

For ease of understanding the preferred embodiment of the present invention, the following outline is provided.

A. Moving Lens and Film, Stationary CCD Camera

Microfiche consists of rows and columns of individual images. Each individual image position must be centered upon a scanner's optical axis. In the present invention, to select a row, the lens is displaced vertically, while the CCD camera remains stationary. To effect X-directed scanning, the microfiche or aperture card is moved slowly past the optical axis. In this novel manner, the CCD camera sees only a vertical line of pixels at a time.

B. Line Illumination for Scroll (moving film) Scanning

Typically, a microfiche is about 4 inches high by about 6 inches long. Since the objective lens must be evenly illuminated over the 4-inch height, a line illumination system is desirable. Light intensity must be uniform over this line and light rays must be fairly well collimated in order to minimum resolution loss due to scattered light. While this line must be 4 inches high, it need only be wide enough to illuminate a singe line of vertical pixels at the CCD camera. The present invention accomplishes this in a novel manner whereby a long lamp filament, positioned off-axis, is utilized. A parabolic reflector captures the light emitted from the filament and sends relatively parallel light rays down an optical path toward the camera. Since the parabolic reflector focuses light only in a single axis, two plastic Fesnel condensing lenses are utilized to capture some of the vertically dispersed light and focus it at a point behind the CCD camera. In this regard, to avoid a projected filament image at the camera, the condenser lens pair focuses in back of the filament, thus placing the filament image out of focus at the camera.

C. Multi-resolution CCD Camera

The CCD camera comes in a varying number of pixels and pixel sizes over its length. To access these pixels, electrical charges in proportion to intercepted light must be "shifted out", "bucket brigade" fashion. The more pixels, the longer it takes to shift out a complete scan line and scanning a large document at high resolution requires a long CCD. However, since low resolution scanning of a small document requires far fewer pixels in a scan line, the present invention utilities a second CCD camera having a reduced number of pixels. As a result, a line can be scanned faster by the CCD as compared with conventional methods.

In another novel aspect of the present invention, a vertically moving objective lens permits a camera where two CCDs can be positioned end to end, one long and one short. By displacing the lens vertically, a film image can be projected upon either CCD at will. Low resolution scan speed can be enhanced, while high resolution scanning can also be achieved without exchanging cameras.

D. Prescan Camera

The apparatus of the present invention utilizes a miniature CCD video camera ahead of its primary scan station. This camera's purpose is to quickly preview at low resolution the media's entire face so that image positions may be determined or aperture card holes mapped.

The prescan camera views an area approximately 1 inch wide by 4.13 inches high (height of microfiche). As the microfiche or aperture card passes by, the camera captures the entire film or card, top to bottom and end to end in several sequential exposures. These exposures overlap horizontally and are stitched together by software algorithm, as more particularly disclosed in the copending patent applications. In addition, algorithmic correction of video camera lens geometry distortion is accomplished.

By the time media reaches the primary scan station, all image positions have been identified and their boundaries established. In this regard, the time required for this step is substantially reduced, as compared to conventional techniques. Thus, this aspect of the invention represents a novel advance in the art by eliminating a prior art requirement for scanners utilizing a primary high-resolution scan station with multiple horizontal passes to capture the entire image area, a time consuming process.

E. Automatic Optics Respacing

The present invention utilizes an optical assembly that lies within the system enclosure. Two carriages ride on common rails, driven by lead screws and small DC servomotors. One carriage carries the CCD camera board; the CCD chip itself is positioned behind the vertical slit. The other carriage carries an objective lens mounted upon a vertically moving lens board. This vertical movement provides access to every image row on a microfiche. A novel aspect of this embodiment lies in the vertically moving lens, carried by a Z-axis carriage on common rails with the CCD camera carriage.

In operation, the system's digital controller solves a simple lens equation based upon three variables: lens focal length, optical reduction ratio and pixel resolution at original document scale, or "dots per inch" (dpi). It then drives the Z-axis carriages to their calculated positions. In this regard, the lens is finely adjusted in the Z-axis to achieve optimum focus. The controller commands a succession of image scans, each time displacing the lens carnage slightly. It analyzes the images and then returns the lens carnage to the position giving best focus.

F. Constant Illumination, Variable Camera Sensitivity

The present invention utilizes a Quartz halogen long-filament lamp, operated slightly below rated voltage to extend lamp life, while still maintaining sufficient bulb temperature to support its self-cleaning cycle. A control circuit looks at the lamp to detect any variation in light output, then closes a control loop to alter lamp voltage, thereby stabilizing light output. In practice, lamp current is pulse-width modulated to eliminate linear power dissipating devices from the circuit. Modulation frequency is well above power line frequency so that any light fluctuation due to power line hum is eliminated. This feature permits the lamp to be operated directly off rectified power line AC voltage with very little filtering. The lamp circuit has the means to forewarn the operator when lamp current becomes too high to sustain light output, thus sign that the lamp should be changed before failure occurs.

Since lamp light output is stabilized, camera sensitivity adjustment is accomplished over a limited range by varying the CCD's light integration time (time for light induced charge to accumulate at the photosite). Further, dynamic adjustment of camera brightness and contrast can be accomplished in software following image digitizing, as set forth more fully in the copending patent applications.

G. Using Prescan Camera to Read Punched Holes from Aperture Card

Non-image portions of an aperture card contain punched holes similar to the tab cards from which they w derived. Tab cards have rectangular holes, arranged in 0 through 9 numbered rows by 80 columns. Aperture cards utilize fewer positions, depending upon the particular card format These coded holes contain information about the embedded image that enables the card to be sorted or retrieved automatically on conventional tab card equipment.

To capture these holes, the present invention precisely detects the card's leading edge with a rotary encoder. It then clocks the distance to each column of holes, reading each in turn with the prescan camera. By the time the card reaches the primary scan station, all coded information has been read.

A novel aspect of this embodiment lies in the use of the prescan camera for both image position finding and hole detection.

H. Prescan Camera Illumination

Media passing in front of the prescan camera must be backlighted. Conventionally, diffuse backlighting is achieved with a light box, painted flat white inside and covered on the front with opal or milk glass. To avoid a lamp "hot spot", an image of the lamp showing through the diffuser, the lamp must be placed back some distance from the diffuser. This adds considerable depth to the light box In the present invention, space behind the backdrop is at a premium.

Therefore, a flat electroluminescent panel having virtually no depth replaces the traditional light box. While panel light output is relatively low, it is sufficient for the video camera employed.

I. Multi-Media Feeder

In a presently preferred embodiment of the invention, one feed mechanism accommodates three types of scannable media, microfiche, jacketed fiche and aperture cards. Rollers grasp media near a lower edge, so that documents whose height varies from approximately 3.25 to 4 inches will transport equally well Alternatively, a manual feed slot is provided so that individual documents of any size up to 4 inches in height by 7.35 inches in length may be inserted (7.35 inches is the length of a typical aperture card).

While FIG. 1 shows a host device, communication network, modem, hard drive, processors and X, Y and Z axis servo systems, these components will not be described herein since they are described in the copending patent applications.

Referring now to the drawings and more particularly to FIG. 1 thereof, there is shown an apparatus for processing microfiche images 10 that is constructed in accordance with the present invention. The apparatus 10 converts light passing media, such as paper and microfilm records, into enhanced digital information to enable knowledge workers and consumers to share the converted records electronically over the Internet and within company intranet connections. More particularly, the microfiche processing apparatus 10 enables punched cards and microfiche image documents to be converted into enhanced digital documents. This is accomplished without substantially altering the appearance of complex graphic and picture objects, without distorting fine image features and graphic shapes, and with all or substantially all background artifacts present in A documents removed from textual images to provide crisp, sharp, black-and-white cyber documents. In short, the microfiche information processing apparatus 10, through a novel combination of image scanning and processing techniques, produces graphic and photographic images that are substantially restored to their original image contrast, sharpness and content, even in the presence of cuts, scratches and lines in the original documents.

This disclosure will make reference to microfiche for the purpose of describing the processing apparatus 10. There is no intention, however, of limiting the scope of the present invention to microfiche only. Further, where the term "light passing media" is used it includes, but is not limited to, cut roll-film, aperture cards, punched cards and other types of documents capable of producing textual, graphic or photographic images when illuminated by a light source. In this regard, the term "cut-media" may be used to distinguish between such media and rollfilm on spools.

The microfiche processing apparatus 10 generally comprises a workstation housing 12 for supporting, in a stationary manner, a prescan station, generally indicated by the reference numeral 14, having a stationary low resolution area videoscan camera 16 and a document conversion station, generally indicated by the reference numeral 18, having a movable high resolution line scan camera 20. The prescan station 14 and the conversion station 18 cooperate to provide unattended processing of large sequences of light passing documents. In his read, the microfiche process apparatus 10 utilizes a principal area prescan concept to identify active age regions in a microfiche or aperture card to facilitate the unattended processing of large sequences of cut-media images. The prescan station 14 detects image regions and image borders in a variety of image formats in order to limit the high resolution scanning operations of the document conversion station 18 to only those active areas identified during prescan operations. More particularly, the prescan station 14, as will be explained below in greater detail, identifies accurately the active areas of a light passing document regardless of image size, image format, image shapes, and image patterns. In short, the prescan station 14 can process both standard and non standard image documents in large sequences of both a uniform nature and a non uniform nature, without any substantial operator involvement.

Figure 2:
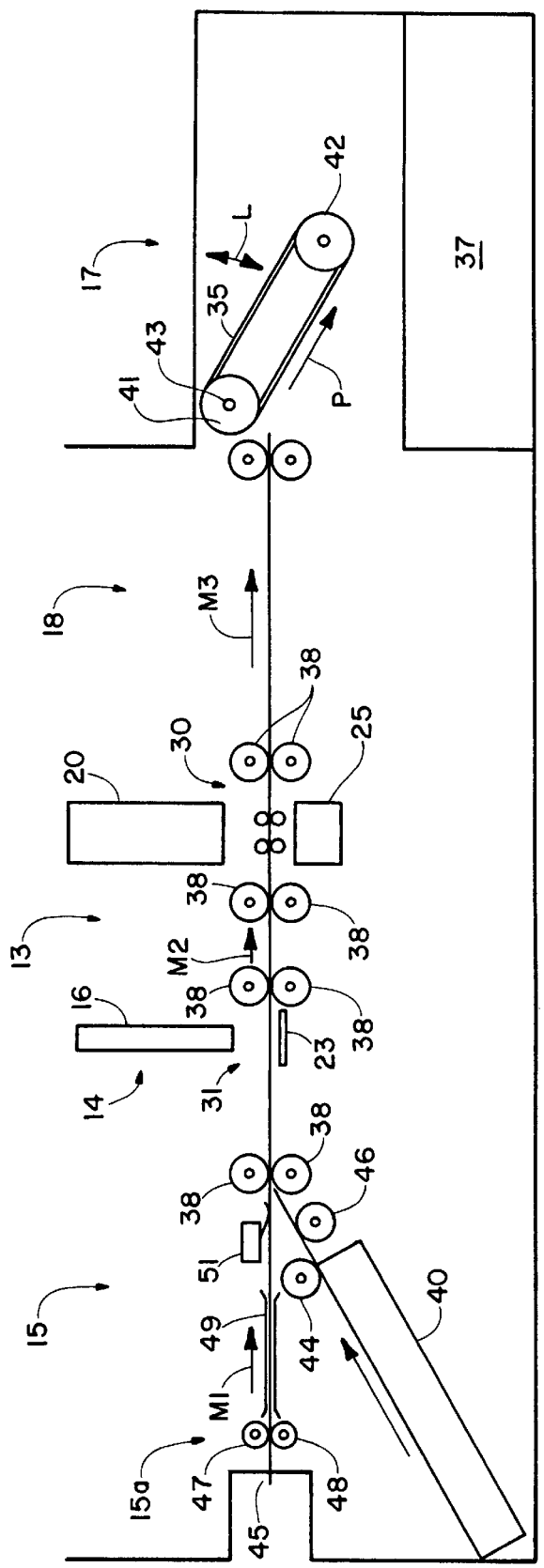
FIG. 2 is a block diagram showing components of some subassemblies of the apparatus shown in FIG. 1.

With reference now to FIG. 2, in order to facilitate the transport of the light passing media between the prescan station 14 and the document conversion station 18, the microfiche processing apparatus 10 includes a transport unit 13 that is sandwiched between a document feeder 15 and a document stacker 17. The document feeder 15, as will be explained below in greater detail, receives in a stacked manner a large number of light passing media, such as microfiche, aperture cards and Hollerith cards, which are fed seriatim to the transport unit 13 to facilitate scanning of the document information disposed on each card. The documents can be fed automatically or manually. After the document information on the card has been converted to digital information, the transport unit 13, moving the document in the direction indicated by the arrows M1, M2 and M3, delivers the processed card seriatim to the document stacker 17 to cause the card to be neatly stacked for removal from the microfiche processing apparatus 10. With regard to system function, the automatic and robust identification of active image areas, below called "region finding," is critical to unattended operation. That is, in order to facilitate unattended operation of the apparatus 10, the prescan station 14 must automatically detect the original recorded image areas.

Those skilled in the art will recognize that microfiche and microfilm images have been captured over the years m various image sizes, formats, and region/border shapes and patterns, many of them non uniform and non standard in nature. However, a standard microfiche and aperture card have been adopted. Microfiche is approximately 4 inches in height and 6 inches in length and includes a block of apertures arranged in series of equally spaced rows and columns.

In order to detect and scan successfully such a large variety of image forms, patterns and borders, the prescan station 14 includes a prescan controller or processor 22 that cooperates with the low resolution scan camera 16 to detect automatically active image regions and borders in a variety of image formats. In this regard, the low resolution scan camera 16 quickly previews at low resolution the entire face of the media so that image position may be determined (or aperture card holes mapped). The camera 16 views an area approximately 1 inch wide by 4.1 inches high, which corresponds to the height of microfiche.

As the media passes by the camera 16, the microfiche is illuminated from behind by a shallow depth electroluminescent panel 23 that uniformly illuminates each microfiche in view. In this regard, the panel 23, unlike conventional light boxes, has substantially no depth and generates virtually no heat at a relatively low luminance level However, even at a low luminance level, the low resolution scan camera 16 can capture the microfiche images passing by it. In this regard, as the microfiche or aperture card is illuminated by the panel 23, the camera 16 detects the illuminated microfiche or card, capturing the entire format, top to bottom and end to end in several sequential exposures. The exposures overlap horizontally and are stitched together by the prescan processor 22 utilizing a set of image processing mathematical fitting and optimization algorithms and statistical modeling methods (described in the copending applications) to identify image borders in standard and difficult, old, noisy microfiche formats.

In summary of prescan operations, it may be said that in prescan neither lens nor video camera moves. Only the film moves horizontally, stopping several times behind a one-inch scan aperture 30 in the transport to capture a six-inch document end to end. As discussed more full in the copending applications, these "snapshots" are then stitched together in a novel manner.

With regard now to system function in the prescan station 14, in order to uniformly illuminate the media passing through the prescan station 14, the electroluminescent panel 23 is disposed in alignment with the stationary low resolution scan camera 16. In this regard, the panel 23 is configured to illuminate uniformly a 1 inch made portion of a 4 inch high card. These are sufficient dimensions to permit strips of the microfiche card to be captured and stitched together electronically.

The media transport unit 13 precisely shuttles the microfiche and aperture cards back and forth in the across the scan aperture 31. As best seen in FIG. 2, the media transport unit 13 holds the media in a relative vertically stationary position for scanning purposes. That is, unlike conventional microfiche scanners, the transport unit 13 includes no X-Y mechanism to move the microfiche about. Instead, horizontal or X-axis positioning of the microfiche or aperture card is accomplished by pinching the microfiche or aperture card between a set of pinch rollers indicated at 38 and generally at 32. Vertical or Y-axis positioning is unnecessary in the prescan station 14 since the camera 16 and its associated objective lens 36 are set to a wide angle that is sufficient to capture the entire height and a substantial horizontal portion of the microfiche.

It will be understood by those skilled in the art that critical to this method of media transport is the ability to maintain microfiche position control very precisely and to keep the microfiche acceptably flat within the scan aperture 31. In this regard, flatness of the microfiche is assured with four small diameter, closely spaced rollers, such as the rollers 38. The rollers 38 are spaced so that two rollers are disposed on either side of the scan aperture 31. The scan aperture 31 is sufficiently narrow, and the microfiche is sufficiently stiff, that edge to edge scanning is possible since the microfiche lies well within the depth of focus of the objective lens 36.

As mentioned, document feed to the prescan station 14 may be automatic or manual In the automatic mode, microfiche or aperture cards are loaded on-edge in a media-receiving tray 40. When the prescan processor 22, under the control of a transport control algorithm, initiates a feed command, a rubber-covered drive roller 44 slides one of the stacked microfiche out from the tray stack. A retard roller 46, disposed at a leading edge portion of each microfiche as the microfiche is moved from the bottom of the stack, prevents more than one microfiche from being transported from the tray 40. Stated otherwise, the retard roller 46 generates an opposing force action causing any excess microfiche pulled from the tray 40 to be moved back onto the bottom of the stack in the tray 40. The opposing drive roller 44 and retard roller 46 always rotate in a single direction causing the media to separate and exit the tray stack. Media moved from the tray 40 are then scanned by the low resolution scan camera 16.

Manual document feed may be accomplished by a manual feed subsystem 15a whereby a document is fed through a port 45 to be moved by retractable rollers 47 and 48 through a guide 49. Subsequently, the document is engaged by a first pair of the rollers 38 to be moved into the prescan station 14. A manual feed sensor 51 is used to monitor flow of documents through the subsystem 15a to ensure that the microfiche processing apparatus 10 is functioning either in automatic or manual mode.

Upon completion of prescan, the document is moved by the transport unit 13 to the document conversion station 18 where active image areas are positioned at a scan aperture 30. The station 18 includes a document conversion processor 19 that is coupled to the prescan image processor 22 to facilitate the focusing of the high resolution line scan camera 20. Such focusing of the line scan camera 20 is a key feature of the present invention enabling system operation with no operator manual intervention. As set forth in the copending patent applications, an automatic focus algorithm evaluates a scanned image and then determines and commands an optimal focus position for a Z-axis lens carriage unit, generally indicated by the reference numeral 21 in the document conversion station 18.

Upon exiting the document conversion station 18, the microfiche is stored seriatim in the document stacker 17. This is accomplished when the microfiche, moving in a direction indicated by the arrow P, is picked up by a moving O-ring belt 35 and delivered to a tray 37. The belt is looped over pulleys 38 and 39. The pulley 38 is pivotally attached at a pin 39a to permit the pulley 39 to move in the directions indicated by the double arrow L thereby ensuring that, as documents accumulate in the tray 37, the pulley 39 and the belt 35 are raised so as not avoid interference with the delivery of the documents to the tray 37.

As an aid to understanding the cooperation between the prescan station 14 and the document conversion station 18, reference may be made to FIG. 3. As shown, a light passing medium, such as the medium 101, travelling in the direction of the arrows 103 and 105 moves from the prescan station 14 to the document conversion station 18. In the prescan station 14, the incremental area scan camera 16 facilitates the capturing and stitching of an image indicative of the light passing medium by incrementally viewing a portion 108 of the light passing medium 101. (The capturing and stitching processes are discussed in detail in copending application Ser. No. 09/504,255. The scanned area of the potion 108 is defined by dotted lines 109a through 109d.

After the prescan function is completed, the light passing medium 101 moves to the document conversion station 18 where the specific area line scan camera 20 facilitates the capturing and conversion of individual ones of a plurality of light pang areas represented by the area 111. The area 111 is one pixel wide and is defined by dotted lines 112a and 112b. (The capturing and conversion processes are discussed in detail in copending application Ser. No. 09/504,256).

To illuminate properly the light passing media with a light source that minimizes resolution lose due to scattered light, the document conversion station 18 further includes a high intensity illumination subsystem 25. This subsystem collimates and substantially uniformly illuminates the light pang media with balanced light It differs considerably from conventional illumination systems since it must illuminate a narrow strip of film, instead of the entire frame, because scanning is accomplished by moving the film horizontally in a "scroll" mode. Furthermore, because the lens moves up and down over a distance of four inches, this illuminated strip is relatively extraordinarily long.

As shown schematically in FIG. 4, the illumination subsystem 25 includes a strip lamp 29 producing light that is captured by a truncated parabolic trough reflector 26. The reflector 26 collects the light and deflects it 90 degrees toward infinity. Since the parabolic trough reflector 26 has power in only the horizontal axis, the light is widely disbursed vertically. While this reduces efficiency, it ensures that the usable rectangle of light is very uniform in intensity.

The illumination subsystem 25 utilizes back to back molded plastic Fresnel lenses 27 and 28. With a series of concentric annular grooves, each lens approximates planoconvex glass lenses of much greater thickness. The lenses 27 and 28 are akin to ordinary glass lenses with spherical curvature. No condensing lens focal length has been found that suits the limits of film to CCD magnification of the present invention as well. This design favors the microfiche application where ages are off-axis and magnification is generally greater. For aperture cards, it matters less because images are closer to the primary optical axis.

As stated above, the illumination system 25 utilizes a long-filament strip lamp 29. By placing the lamp 29 inside the focal length of a first condenser, the Fresnel lenses 28 and 27, light is gathered in much the same way as if a point filament lamp were placed at condenser focus. The difference is that the filament image is out of focus everywhere, making illumination much more uniform without excessive loss of collection efficiency. In addition, the strip lamp 29 is placed off axis, so the condenser does not focus the lamp image directly. During operation of the subsystem 25, a pane of heat-absorbing glass 33, interposed between the reflector 26 and the first Presnel lens 28, remove infrared rays that would otherwise burn the film. In this regard, to prevent re-radiated heat from the heat absorbing glass 33 from warming the plastic Fresnel lenses 28 and 27, a "hot mirror" of thin optically coated transparent material 33a, sandwiched in front of the Fresnel lens 28, reflects infared back toward the light source.

In a preferred embodiment of the invention, light is intercepted by the six-inch focal length plastic Fresnel lens 28. This lens is 1-inch wide by 6-inches long. With its near side focused at a point behind the parabolic reflector 26, its opposite side focuses at infinity. Behind this lens is the other Fresnel lens 27 that focuses at a point behind the high resolution line camera 20 when magnification is at its extreme of 5.3×. The net effect is to illuminate the film with a reasonably well-collimated strip of light about ¼-inch wide by 5-inches long. Thus, in a novel maimer, the filament image is gone and illumination is very even end to end over the useful vertical dimension.

The preferred lamp 29 is a 150 watt, 120 volt halogen-filled device intended for external reflectorized floodlamp applications. Unlike most small-filament projector lamps, its rated life is much longer, in this case 1500 hours. Most projector lamps of this wattage are rated at about 50 hours. By operating this lamp slightly, its life can approach an expectancy of about 3000 hours. A halogen lamp should not be operated at a power less than about 80 percent of its rated power. When operating temperature gets too low, the lamp self cleaning cycle fails and filament residue becomes deposited on the inside of the bulb, reducing light output. For this reason, it is better not to vary lamp intensity to adjust signal level In the present invention, controlling the high-resolution line camera 20 integration time accomplishes the same thing, but in a more linear and predictable fashion. Another reason for avoiding lamp intensity modulation is color temperature change. As the lamp becomes dimmer, its spectral output shifts toward the red, a part of the spectrum for which the CCD is not calibrated. Also, lens focus will deteriorate because it is not a perfect achromat.

The lamp 29 is operated at constant intensity, stabilized, in a conventional manner, by the action of a current sensor and a current control loop. It is operated directly off rectified input AC power to reduce regulated power taken from the 12 volt power supply and its intensity is stabilized by controlling lamp current through a pulse width modulated series MOSFET transistor. In this regard, modulation frequency is high enough to avoid lamp flicker and eliminate 120 Hz ripple from the rectified power line. The lamp 29 is cooled by forced air from a small fan (not shown). This air also serves to cool the heat-absorbing glass 33, thus lessening reradiation that might soften the acrylic plastic Fresnel lenses 27 and 28.

With reference now to FIG. 5, lens and CCD camera relationships may be considered. In this figure, there is shown a technique of scanning different formats with the same CCD camera by respacing the optics. In this regard, lens and CCD camera positions are illustrated for the two extremes of film image magnification. For example, a lens 134 and a camera 139 show relative positions for minimum magnification while a lens 134*a* and a camera 139*a* show relative positions for maximum magnification. Furthermore, the lenses 134 and 134*a* illustrate vertical lens displacement to image either the top or bottom of the film upon the camera at extremes of image magnification.

Figure 7:
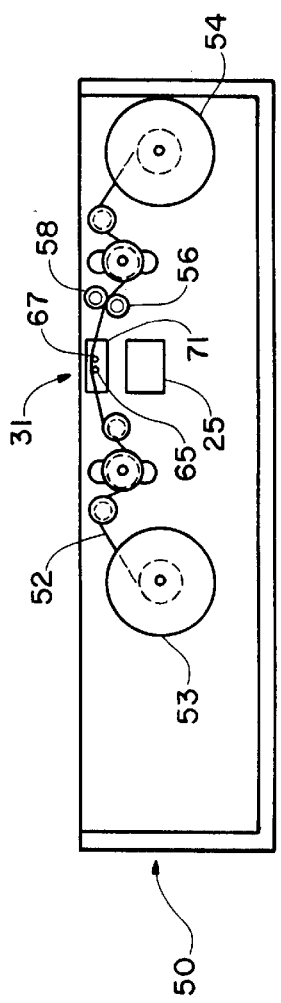
FIG. 7 is a schematic representation of a roll-film drive subassembly of the present invention.

Referring now to FIGS. 6 and 6A, there are shown two microfiche formats of differing page to film ratios. In the present invention, the formats are scanned with the same CCD by respacing the optics, as shown in FIG. 5. In this manner, the lens 134 and CCD 139 positions (FIG. 5) would scan large images, represented by reference numeral 59 of FIG. 6, at the least magnification. On other the hand, the lens 139*a* and CCD 139*a* positions (FlG. 6A) would scan small images, represented by reference numeral 63, at greater magnification With reference now to FIG. 7, there is shown a rollfilm transport module 50 that is readily installable into, and removable from, the microfiche processing apparatus 10. The module 50 has the same footprint as the transport unit 13. In use, film such as the film 52 is transported from a spool 53 to a spool 54. The spools are driven conventionally. The module 50 is capable of handling 16mm or 35mm non-perforated film in, typically 100 foot lengths. The film 52 is precision driven by a rubber covered drive capstan 56 that is held in firm contact with the film 52 by a spring loaded pinch roller 58.

Scanning of the film 52 is accomplished by scrolling the film precisely past the scan aperture 31 the edges of which are defined by reference numerals 61 and 63. In a preferred embodiment, the scan aperture 31 is a narrow space —about one inch in width-between two small-diameter, closely spaced rollers 65 and 67. The rollers 65 and 67 serve to maintain the film 52 coincident with the focal plane and to flatten longitudinal film curl Two sapphire edge guides 71 cooperate with the rollers 65 and 67 to maintain the film's lateral position within the scan aperture 31.

Referring now to FIG. 8, there is shown another apparatus and method of processing microfiche images 100, is constructed according to the present invention The apparatus is substantially similar to the above described apparatus 10 except that in this case, a moving lens utilized in the image conversion station 18, enables several variations of lens-CCD camera interrelationships. In one such novel relationship, two CCD's end to end, provide both low-resolution high-speed and high-resolution low-speed scanning. In this regard, reference may be made to FIG.8A wherein this method of scanning is depicted. As shown in the figure, lower resolution at a higher speed is accomplished as a lens 311 moves a distance D, in the direction shown by the arrow, away from a film image 315. Simultaneously, the lens 311 moves in a direction, shown by the arrow N2, away from an optical centerline C. As further shown in the figure, a long CCD 320 and a short CCD 322, commonly mounted on a board 325, move in tandem, in a direction shown by the arrow N3, toward the lens 311, to focus the film image 315 on the short CCD 322. In this manner, lower resolution at higher speed is accomplished.

The interrelationships among film image, lens and CCD change when higher resolution at lower speed is desired. This condition is shown in FIG. 8B. In this case, the lens 311 moves toward the film image 315, in a direction shown by the arrow N4, until the two are separated by a distance d. At the same time, the lens 311 moves above the optical centerline C in a direction shown by the arrow N5. Simultaneously, the board mounted CCD's move in tandem, the direction shown by the arrow N6, away from the lens 311 until the film image 315 is focused on the long CCD 320. In this manner, higher resolution and lower speed are accomplished.

While specific embodiments of the present invention have been described, other iterations are to be considered within the scope of this specification, and the appended claims. Thus, for example, the present invention may be modified to perform the functions above described by a single, movable CCD camera that moves between the prescan station 14 and the image conversion station 18 to provide both low-resolution, and high-resolution, scanning.

Further, a single fixed resolution camera and a pair of movable high-resolution cameras, either long or short, may be provided in a singe station where the high-resolution cameras move relative to one another to provide high resolution images having substantially different sizes.

Finally, there may be provided a single fixed position low-resolution CCD camera and a pair of side-by-side CCD's, one long and the other short, that move independently of one another.

It will be appreciated by those Skilled in the art that the present invention can be embodied in other specific farms without departing from the spirit or essential characteristics thereof. For example, while the embodiments above have been described with reference to a microfiche, the invention is also applicable to other types of media including, for example, aperture cards, cut film and roll film. The presently disclosed embodiments are therefore considered in all respects to be illustrative and not restricted. In this regard, the scope of the invention is indicated by the appended cis rather than the foregoing description and all changes that come within the meaning and range and equivalence thereof are intended to be embraced therein.

What is claimed is:

1. An unattended pre-calibrated apparatus for processing microfiche images, comprising:

an unattended low resolution wide area pre scan station for identifying active image areas and borders on a plurality of light passing documents transported seriatim along a prescan path, said low resolution wide area pre scan station generating a plurality of active image area signals indicative of the active image areas and borders on each one of said plurality of light passing documents; and an unattended high resolution line scan station having a high resolution line scanner responsive to individual ones of said plurality of active image area signals for focusing said high resolution line scanner on only the active image areas of said light passing documents and for converting the image information carried on the individual ones of said light passing documents into corresponding enhanced digital information signals indicative of the image information carried on the individual ones of said light passing documents.

2. The microfiche image processing apparatus according to claim 1, wherein said low-resolution wide area prescan station includes a low-resolution area scan camera.

3. The microfiche image processing apparatus according to claim 1, wherein said high-resolution scan station includes a high-resolution scan camera.

4. The microfiche image processing apparatus according to claim 1, wherein said system includes a document feeding subsystem and a document stacking subsystem.

5. The microfiche image processing apparatus according to claim 4, wherein said system includes a manual document feed subsystem, said subsystem including means for receiving a manually fed document and means for guiding said document into said prescan station.

6. The microfiche image processing apparatus according to claim 5, wherein said receiving means includes retractable rollers.

7. The microfiche image processing apparatus according to claim 5, wherein said subsystem includes means for sensing the presence of a document in said subsystem.

8. The microfiche image processing apparatus according to claim 4, wherein said system includes a document transport unit disposed between said document feeding subsystem and said document receiving subsystem.

9. The microfiche image processing apparatus according to claim 2, wherein said prescan station includes a processor, cooperating with said low resolution scan camera, to detect active image regions and borders in scanned documents.

10. The microfiche image processing apparatus according to claim 1, wherein said system includes means for illuminating uniformly scanned documents at low luminance levels.

11. The microfiche image processing apparatus according to claim 10, wherein said means for illuminating uniformly includes an electroluminescent panel.

12. The microfiche image processing apparatus according to claim 1, wherein said high resolution scanning station includes an illumination system.

13. The microfiche image processing apparatus according to claim 12, wherein said illumination system includes a lamp, a trough reflector and a plurality of Fresnel lenses.

14. The microfiche image processing apparatus according to claim 13, wherein said lamp is a long-filament strip lamp.

15. An unattended pre-calibrated microfiche image processing apparatus, comprising:

an unattended low resolution wide area pre scan station for identifying active image areas and borders on a plurality of light passing documents transported seriatim along a prescan path, said low resolution wide area pre scan station generating a plurality of active image area signals indicative of the active image areas and borders on each one of said plurality of light passing documents wherein said prescan station includes a fixed lens and a camera; and an unattended high resolution line scan station having a high resolution line scanner responsive to individual ones of said plurality of active image area signals for focusing said high resolution line scanner on only the active image areas of said light passing documents and for converting the image information carried on the individual ones of said light passing documents into corresponding enhanced digital information signals indicative of the image information carried on the individual ones of said light passing documents.

16. An unattended pre-calibrated microfiche image processing apparatus, comprising:

an unattended low resolution wide area pre scan station for identifying active image areas and borders on a plurality of light passing documents transported seriatim along a prescan path, said low resolution wide area pre scan station generating a plurality of active image area signals indicative of the active image areas and borders on each one of said plurality of light passing documents; and an unattended high resolution line scan station having a high resolution line scanner responsive to individual ones of said plurality of active image area signals for focusing said high resolution line scanner on only the active image areas of said light passing documents and for converting the image information carried on the individual ones of said light passing documents into corresponding enhanced digital information signals indicative of the image information carried on the individual ones of said light passing documents wherein said high resolution line scan station includes a movable lens and a movable camera.

* * * * *